United States Patent Office 3,442,831
Patented May 6, 1969

3,442,831
VINYL CHLORIDE POLYMERIZATION PROCESS AND LATEX
Jack Dickstein, Leominster, Mass., Isadore Nathan Cooperman, Plainfield, N.J., and James John Cesanek, Newark, Del., assignors to The Borden Company, New York, N.Y., a corporation of New Jersey
No Drawing. Filed Apr. 21, 1966, Ser. No. 544,074
Int. Cl. C09k 5/02, 3/74; C08f 29/18
U.S. Cl. 260—17
10 Claims

ABSTRACT OF THE DISCLOSURE

This invention relates to a method of making a stabilized aqueous dispersion of a resin comprising polymerized vinyl chloride and to the resultant product; the process consisting essentially of dissolving a cellulosic ether and a sulfodicarboxylic acid amide of an aspartic acid or its esters into the heated latex and cooling the latex.

---

Although polyvinyl chloride latexes containing protective colloids have been used extensively for this purpose, there have been difficulties which are considered to be limitations on its use. These include lumping, coagulation or flocculation of the latexes of the desirably high concentration, unsatisfactory mechanical stability during vigorous mixing and external shearing action to which the particles of dispersed polymer are subjected during compounding into a finishing composition, and the appearance of grains or grit in the final latex. To reduce or avoid these limitations, it is common to lower the concentration of the polymer and the total solids of the latex. This is not an altogether satisfactory solution due to the resulting added economic burden.

We have now found that a latex can be made having high solids content, e.g., about 55%, satisfactory mechanical stability, relatively low viscosity for a given concentration, and other advantageous properties, by the process of dissolving a protective colloid in the latex in hot condition and introducing therein a special agent, that in our combination, reduces the viscosity.

Briefly stated, our invention comprises the herein described composition of a vinyl chloride polymer and the stabilizing combination of methyl cellulose or like protective colloid and a water soluble asparate amide of an aliphatic sulfodicarboxylic acid. The invention comprises also the process of compounding the latex which includes dissolving a cellulosic ether in the latex in hot condition, as in the range of about 120° F.–200° F., and admixing an alkali metal or ammonium salt of said amide. The aqueous dispersion so made is then cooled and is suitably mixed in the cold with an aqueous dispersion of an additional amount of protective colloid.

The resin used is ordinarily a vinyl chloride interpolymer with up to half of the resin weight being ethenoid bond polymerizable comonomers; vinyl chloride homopolymer can also be used. Examples of the comonomers are vinyl acetate, vinylidene chloride, $C_{1-8}$ alkyl ester of acrylic or methacrylic acid, $C_{1-8}$ diesters of maleic or fumaric acid or mixtures thereof. The polymer is preferably supplied in the form of a fine aqueous dispersion such as a latex in which the particle size is small and suitably .1 to .4 micron and ordinarily about .2 micron.

The plasticizer for the polymer may be any of the usual, substantially nonvolatile solvents for such polymer, as, for example, about 10–40% of its weight of dibutyl, dihexyl or dioctyl phthalate; tricresyl phosphate; or tetraethylene glycol.

As the protective colloid in the stabilizer combination, we preferably use methyl cellulose of viscosity below 100 c.p.s. as measured in a 2% aqueous solution at 25° C. A particularly satisfactory grade is one of viscosity about 10 c.p.s. We can use other protective colloids that are convention in polyvinyl chloride latexes, examples being ethyl cellulose, sodium carboxymethyl cellulose (CMC), hydroxyethyl cellulose, like cellulosic colloids, sodium alginate and ammonium caseinate.

As the agent for reducing the viscosity when in contact with the protective colloid in stabilizer combination, we use an N-sulfodicarboxylic acid aspartate. Such aspartate is a substituted amide that has the structural formula and composition shown in Formulation 1:

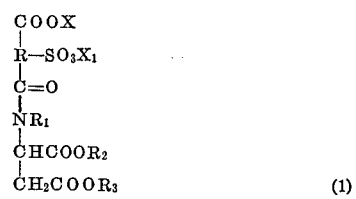

(1)

X and $X_1$ in this formula are hydrogen, or cationic salt-forming radicals. R is the linear aliphatic radical of an aliphatic polycarboxylic acid. $R_1$ is a member of the group consisting of alkyl, alkoxyalkyl, and hydroxyalkyl radicals, having 1–20 carbon atoms. $R_2$ and $R_3$ are hydrogen, $C_{1-20}$ alkyl, or cationic salt-forming radicals.

The aspartate amides are those as described in Patent 2,438,092 issued to Kathryn L. Lynch on Mar. 16, 1948. They are made as there stated.

By the term linear aliphatic radical as here used, we mean the aliphatic moiety which remains from the original aliphatic polycarboxylic acid after its amidation.

More specific examples of the several groups in the viscosity reducing agent are the following:

X and $X_1$ for best results are cationic radicals such as alkali metals, such as Na or K, or $NH_4$.

R is the aliphatic moiety residue of succinic, glutaric, pimelic, suberic, sebacic, or homologs thereof.

$R_1$ is butyl, dodecyl, octadecyl, beta-hydroxyethyl, or 2-ethoxypropyl.

$R_2$ and $R_3$ are monovalent components such as H, Na, K, Li, $NH_4$, alkyls with up to 20 carbon atoms each, and cationic salt-forming radicals, examples of which are the $R_1$ components listed above.

Selection is made from the alternatives for $R_1$, $R_2$, $R_3$ so that at least one of these groups is hydrophilic and at least one is hydrophobic and the whole compound so constituted is both water soluble and a wetting agent.

An alkali metal, as stated above, or ammonium is suitable for X, $R_1$, $R_2$ and $R_3$. Sodium is economical and satisfactory for any or all of these four groups and is recommended for commercial use.

An aspartate amide that we use is "Aerosol 22" to which said patent to Lynch is directed. We use ordinarily the tetrasodium salt of Example 5 or 6 therein, as, for example, N-octadecyl N- (disodium sulfosuccinyl) disodium aspartate.

The combination of the protective colloid and the aspartate amide viscosity reducer gives better mechanical stability at a given high concentration of total solids by lowering the viscosity more than by either the colloid or the amide when used separately in amount equal to the total of the combination.

The exact cause of this synergistic effect in the heated and then cooled latex is not known. It is known, however, than an alkali such as sodium hydroxide can and does react with the hydroxy groups of cellulose, to give an alkali cellulose of hydrophilic nature. Since the sodium salt, for example, of our amide is alkaline, there may result an intimate association of part of the sodium with the hydroxy groups of our cellulosic colloid. This could tie other parts of the aspartate molecule to the cellulosic material, either chemically or physically.

Other additives may be admixed into the latex, of kind, in proportion, and in manner of incorporation that is conventional in making polyvinyl chloride finishing compositions. Examples are finely divided pigments such as carbon black, ultramarine blue, white lead, calcium carbonate and silica.

The following table shows the recommended proportions of the essential components and also illustrative proportions in the broad range. The proportions outside of the illustrative range may create problems of viscosity and when greater than as shown and is considered unnecessary and uneconomical. Amounts here and elsewhere herein are expressed as parts by weight.

TABLE I

| Component | Proportions (for 100 parts by weight of solids in latex [1]) | |
|---|---|---|
| | Recommended | Illustrative |
| Vinyl polymer, including plasticizer, if any | 100 | 100 |
| Protective colloid (initial) | [2] .05–.5 | .01–1 |
| Protective colloid (additional) | [2] .05–.5 | .01–1 |
| Aspartate amide (active) | .1–1 | .01–2 |
| Conventional additives | As desired | As desired |

[1] Water is used in the amount in which it occurs in the latex of the polymer, and, for example, may be 45% of the latex.
[2] Total protective colloid should not exceed about 1 in the recommended range.

The invention will further be illustrated by the following spcific examples of the practice of it. The quantities stated are parts by weight unless specifically stated to be otherwise.

Example 1

There is used a latex of 55% solids content (45 parts of polyvinyl chloride and 10 parts of dioctyl phthalate plasticizer). The latex is heated to 170° F. and .05 parts of methyl cellulose of the 10 cps. viscosity is sprinkled on slowly and stirred into the hot latex. After the mixing is completed, there is added .2 part of N-octadecyl N-(disodium dicarboxyethyl sulfosuccinyl) disodium aspartate. The resulting dispersion is stirred mildly and maintained at 170° for an additional hour at least and until test of a sample of the mix shows that the methyl cellulose dissolves in the latex after cooling. The whole is then cooled to room temperature.

There is then stirred in .1 part of additional methyl cellulose in aqueous solution. The resulting stabilized latex is then ready for use. It shows no breakdown during 30 minute tests under the shearing force in a Hamilton Beach mixer. Although high in total solids, it is not grainy.

The following table shows the results of stability tests in the mixer, under the same conditions, first for the composition as prepared in this Example and then for control compositions made outside the invention.

Table II

| Composition tested | Mechanical stability |
|---|---|
| Example 1, with methyl cellulose and aspartate | 80 minutes. |
| Like Example 1, but no methyl cellulose and no aspartate | About 15 minutes. |
| Like Example 1, but no methyl cellulose but with aspartate | Slightly more than 15 minutes. |
| Like Example 1, with methyl cellulose but no aspartate | Too viscous. |

The proportion of said additional methyl cellulose that is introduced is in proportion of about the total amount initially dissolved and preferably about two times that proportion.

Example 2

The composition and procedure of Example 1 are used except that the sodium component in the aspartate there used is replaced separately and in turn by an equivalent amount of potassium and by ammonium.

Example 3

The composition and procedure of Example 1 are used, except that part or all of the octadecyl groups in the aspartate are replaced by an equimolecular proportion of any other $C_{1-20}$ alkyl, e.g., ethyl, dodecyl, tetradecyl, and hexadecyl.

Compositions made as described withstand satisfactorily the shearing force to which they are subjected during subsequent mechanical compounding operations. The dispersed polymer particles are fine and do not agglomerate into over-size gritty beads during vigorous beating of the latex composition. In a wet screening test, after the final compounding, these particles in the resulting latex will pass substantially complete, as to the extent of 90% or more by weight, through a 120-mesh nylon screen.

The composition of Examples 1–3 may be used as finishing compounds for such materials as textiles and leather by treating said materials with the compositions.

It will be understood that it is intended to cover all changes and modifications of the examples of the invention herein chosen for the purpose of illustration which do not constitute departures from the spirit and scope of the invention.

We claim:
1. In making a stabilized, aqueous dispersion of a resin comprising polymerized vinyl chloride, the process which comprises the steps of:
  (1) heating a latex of said resin to a temperature in the range of about 120°–200° F.;
  (2) mixing into said heated latex:
    (a) a cellulose ether as a protective colloid; and
    (b) as a viscosity reducing agent an aspartate amide of the formula:

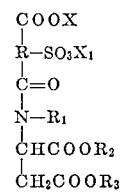

wherein X and $X_1$ are selected from the group consisting of hydrogen and cationic salt-forming radicals, R is the linear aliphatic radical of an aliphatic polycarboxylic acid, $R_1$ is a member of the group consisting of alkyl, alkoxyalkyl, and hydroxyalkyl radicals, having 1–20 carbon atoms, and $R_2$ and $R_3$ are selected from the group consisting of hydrogen, $C_{1-20}$ alkyl, or cationic salt-forming radicals;
  (3) maintaining the dispersion in said temperature range until said cellulose ether becomes soluble in the resulting dispersion when cool; and,
  (4) cooling said dispersion.
2. The process of claim 1, the proportions being about .01–1 part by weight of the cellulose ether and .01–2 parts by weight of the aspartate amide for 100 parts by weight of solid material in said latex.
3. The process of claim 1, said polymer being the homopolymer of vinyl chloride.
4. The process of claim 1, said cellulose ether being methyl cellulose of viscosity below 100 cps. for a 2% solution in water at 25° C.
5. The process of claim 1, said aspartate amide being N-octadecyl N-(disodium dicarboxyethyl sulfosuccinyl) disodium aspartate.
6. The process of claim 5, said cellulose ether being methyl cellulose of viscosity below 100 cps. for a 2% solution in water at 25° C.

7. The process of claim 1 including the step of dissolving in said dispersion after said cooling, additional cellulose ether, the proportion of total of said ether being up to about 1 part by weight for 100 parts by weight of solid material in said latex.

8. The process of claim 7, said additional cellulose ether being admixed as an aqueous solution of said ether.

9. A mechanically stabilized dispersion, consisting essentially of:
(1) polymer of vinyl chloride;
(2) cellulose ether; and
(3) aspartate amide of the formula:

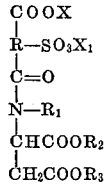

wherein X and $X_1$ are selected from the group consisting of hydrogen and cationic salt-forming radicals, R is the linear aliphatic radical of an aliphatic polycarboxylic acid, $R_1$ is a member of the group consisting of alkyl, alkoxyalkyl, and hydroxyalkyl radicals, having 1-20 carbon atoms, and $R_2$ and $R_3$ are selected from the group consisting of hydrogen, $C_{1-20}$ alkyl, or cationic salt-forming radicals; and
(4) water;
and being the product of the process of claim 1.

10. The stabilized dispersion of claim 9, said polymer of vinyl chloride being the homopolymer of vinyl chloride, said ether being methyl cellulose of viscosity less than 100 cps. for a 2% solution in water at 25° C., the aspartate amide being N-octadecyl N-(disodium dicarboxyethyl sulfosuccinyl) disodium aspartate, and the proportions by weight of said cellulose ether being about .01–1 part of said ether and .01–2 parts of said aspartate amide for 100 parts of solid material in said latex.

References Cited

UNITED STATES PATENTS

| | | | |
|---|---|---|---|
| 2,438,092 | 3/1948 | Lynch | 260—482 |
| 2,528,469 | 10/1950 | Condo et al. | 260—92.8 |
| 2,992,108 | 11/1961 | Knox et al. | 96—85 |
| 3,047,353 | 7/1962 | Klein | 8—86 |
| 3,047,354 | 7/1962 | Owren | 8—86 |
| 3,226,350 | 12/1965 | Smith et al. | 260—29.6 |

WILLIAM H. SHORT, *Primary Examiner.*

E. NIELSEN, *Assistant Examiner.*

U.S. Cl. X.R.

260—29.6